United States Patent [19]
Light

[11] Patent Number: 5,094,757
[45] Date of Patent: Mar. 10, 1992

[54] RADIATOR COOLING SYSTEM CLEANER/REFINER

[75] Inventor: Steven T. Light, Reston, Va.

[73] Assignee: Radiator Robot, Inc., Herndon, Va.

[21] Appl. No.: 527,897

[22] Filed: May 24, 1990

[51] Int. Cl.$^5$ .......................... C02F 1/463; C02F 1/58
[52] U.S. Cl. ..................... 210/712; 210/748;
210/724; 210/740; 210/741; 210/744; 210/765;
210/805; 123/41.14; 123/41.15; 134/3; 134/41;
134/22.1; 134/22.11; 204/149; 204/152;
204/186; 165/95
[58] Field of Search .......................... 123/41.14, 41.15;
134/3, 41, 22.1, 22.11; 204/149, 152, 186;
210/748, 702, 709, 724, 712, 739, 740, 741, 743,
744, 765, 805; 165/95

[56] References Cited

U.S. PATENT DOCUMENTS

| 2,653,420 | 9/1953 | Ruth | 134/41 |
|---|---|---|---|
| 3,699,047 | 10/1972 | Petrey, Jr. | 134/41 |
| 4,293,400 | 10/1981 | Liggett | 204/302 |
| 4,329,211 | 5/1982 | Plantes et al. | 204/149 |
| 4,378,276 | 3/1983 | Liggett et al. | 204/149 |
| 4,540,443 | 9/1985 | Barber | 134/41 |
| 4,569,779 | 2/1986 | Jabalee | 134/41 |
| 4,721,532 | 1/1988 | Kuhn et al. | 134/3 |
| 4,802,991 | 2/1989 | Miller | 210/748 |
| 4,917,782 | 4/1990 | Davies | 210/748 |
| 4,970,015 | 11/1990 | Garcia | 134/3 |

OTHER PUBLICATIONS

Cure Clean-Up & Recovery Corp., "Metals Separation".
Russell R. Renk, "Electrocoagulation of Tar Sand and Oil Shale Wastewaters", Energy Progres, vol. 8, No. 4, 12/88, pp. 205-208.

Primary Examiner—Ivars Cintins
Assistant Examiner—Neil M. McCarthy
Attorney, Agent, or Firm—Stevens, Davis, Miller & Mosher

[57] ABSTRACT

A system for cleaning radiator systems waste coolant, including a filter, a flush tank refinery, a source of cleansing chemical, a pump to circulate radiator coolant from the vehicle through the cleaning system back to the vehicle, a quick-connect conduit extending between the vehicle and the filter, a conduit extending from the filter to the flush tank refinery, a fill tank reservoir, a conduit with valve extending from the flush tank refinery to the fill tank reservoir, a quick-connect conduit with valve extending from the flush tank refinery to the vehicle, a conduit with valve extending from the fill tank reservoir and interconnecting with the quick-connect conduit extending from the flush tank refinery to the vehicle, a conduit with valve extending from the cleansing chemical source to the flush tank refinery, a source of basic chemical, a conduit extending from the source of basic chemical to the fill tank reservoir, a pH sensor in contact with a coolant conduit and a computer to regulate cleansing and basic chemical additions to the system.

6 Claims, 4 Drawing Sheets

5,094,757

RADIATOR COOLING SYSTEM CLEANER/REFINER

The present invention relates to a system for cleaning and rejuvenating internal combustion engine cooling systems coolant. More particularly, the invention relates to a computerized system which removes the coolant from a cooling system, cleanses and rejuvenates the coolant and returns the rejuvenated coolant to the cooling system.

BACKGROUND OF THE INVENTION

Coolant is very expensive to buy and is often not used to its fullest extent. Before being fully used, it is usually drained from the radiator and thrown away. The waste coolant is a pollutant and finds its way into the environment. Due to environmentalists, the local Environmental Protection Agencies are beginning to take action against those who do not properly dispose of pollutants. Recognizing the problem with waste coolant, the automobile repair industry has switched to draining and filtering the contaminated coolant from the automobile, adding chemicals to the drained coolant and putting the coolant back into the same or a different radiator system. Such a procedure actually increases material and labor costs over draining and introducing new coolant and does not satisfactorily solve the matter of pollutants entering the environment.

It is, therefore, an object of the present invention to provide a system for removing the contaminated coolant from the radiator, cleaning and rejuvenating the cooling system and the contaminated coolant and returning the rejuvenated coolant to the cooling system from which it was removed.

It is a further object of the present invention to provide a system which tests the cooling system pressure, thermostat and radiator performance in minutes.

A still further object of the present invention is to provide a system which removes oil contamination and purifies waste coolant to a better than new mixture.

Another object of the present invention is to provide a system which power cleans an automobile cooling system.

Still another object of the present invention is to provide a system which substantially reduces hazardous waste disposal.

SUMMARY OF THE INVENTION

Two quick-connect hoses from the system are attached to the vehicle in a manner which provides maximum cross system flow, usually the radiator filler neck and an opposing hose. The coolant in being cleansed and rejuvenated flows through two cycles i.e. a flush cycle and a fill cycle. The contaminated coolant in the flush tank is re-circulated from the vehicle through a flush tank refinery and back to the vehicle. During the flush cycle the circulating contaminated coolant is chemically and electrostatically cleansed, the ratio of coolant to water is maintained at 50/50 and the pH of the coolant reduced from basic to acidic. The flush cycle has a treating time of approximately 15 minutes but may be run for a longer period. In the fill cycle, the cleansed coolant is pump-circulated to the vehicle from the fill tank and back to the flush tank. During the fill cycle, the now cleansed circulating coolant is fed from the flush tank to the fill tank where it has its pH changed from acidic to basic. Once the circulating cleansed coolant has reached a pH of approximately 8.5 by the introduction of basic chemical into the fill tank, the system is turned off automatically and the hoses are disconnected to complete the operation. There is approximately 5% makeup of coolant required, thus substantially reducing the amount of coolant normally introduced into the environment.

At the time of the flush cycle, the pressure of the system is monitored to diagnose causes of, and corrective steps needed to be taken, with respect to possible automobile thermostat and radiator malfunctions resulting in overheating.

The system comprises a bag filter for filtering out solid contaminants, a flush tank, an electrostatic precipitator within the flush tank, a fill tank, a sump tank for handling leakage and makeup coolant, a pH probe for monitoring the pH of the coolant, a pressure transducer for determining specific gravity of the coolant, containers for chemicals to alter pH of the coolant, a liquid level indicator to determine makeup of the coolant, gauges to determine pressure throughout the system, a computer to render the system semi-automatic, relays to activate components and pumps to circulate the coolant.

BRIEF DESCRIPTION OF THE DRAWINGS

Other details and features of the invention will stand out from the description given below by way of non-limitative example and with reference to the accompanying drawings, in which.

DESCRIPTION OF THE PREFERRED EMBODIMENT

Figure 1:
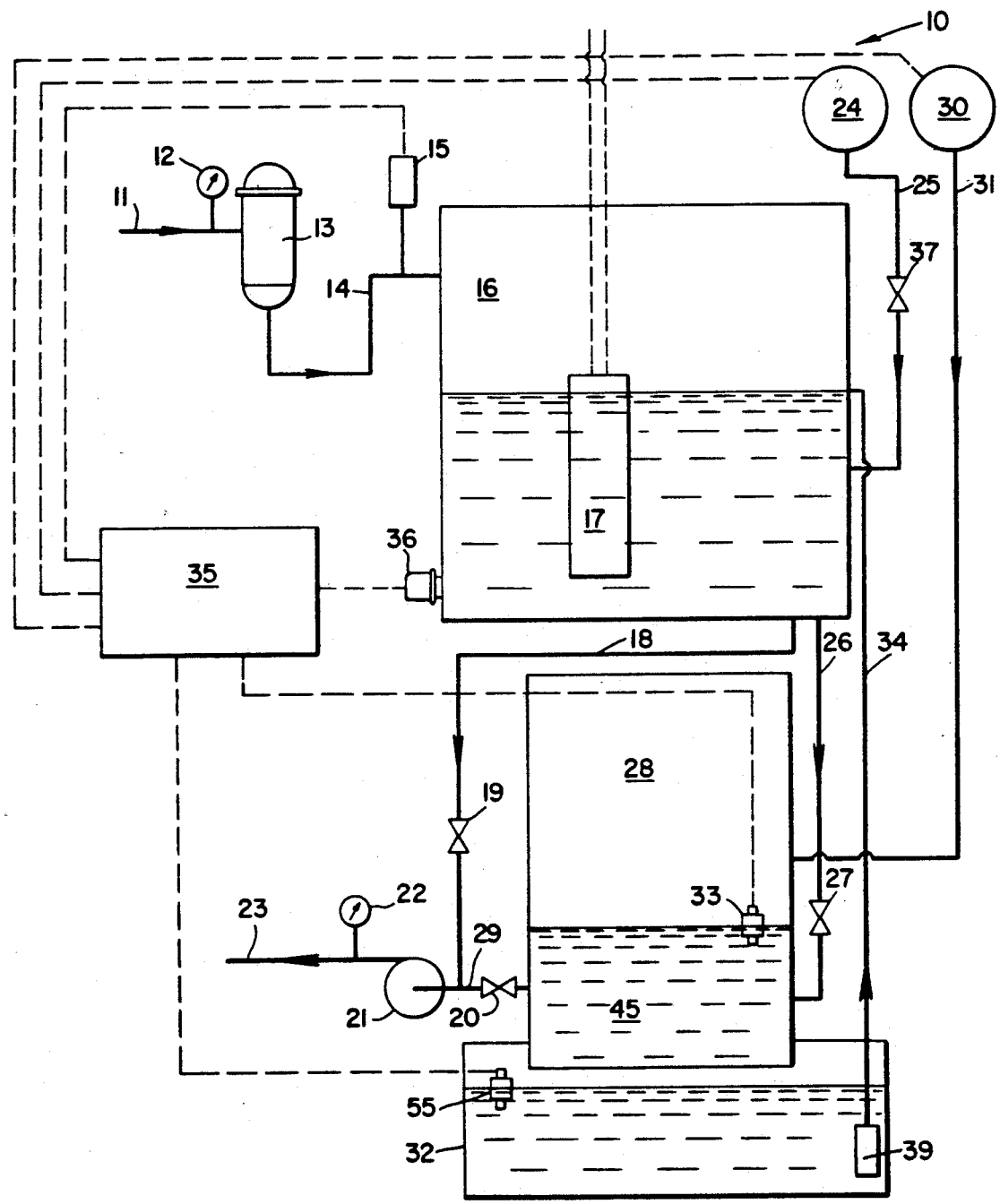
FIG. 1 shows schematically the coolant rejuvenating system of the present invention.

With reference to FIG. 1 of the drawings, the system in general is indicated by 10. Two quick-connect hoses 11 and 23 are attached to any opposing hose and radiator filler neck respectively of the vehicle or an internal combustion engine cooling system to be flushed and filled. The system of the invention is turned on along with the engine of the cooling system to be flushed and filled. The contaminated coolant is pumped through hose 11 to a filter 13 where solids in the contaminated coolant are collected in a bag filter later to be removed. The contaminated coolant then passes through pipe 14 to the flush tank 16 where the contaminated coolant passes from bottom to top through the electrostatic precipitator 17 and out the bottom of flush tank 16, through pipe 18, open valve 19, pump 21 and hose 23 to the vehicle. A constant level of coolant is maintained in the flush tank.

Figure 2:
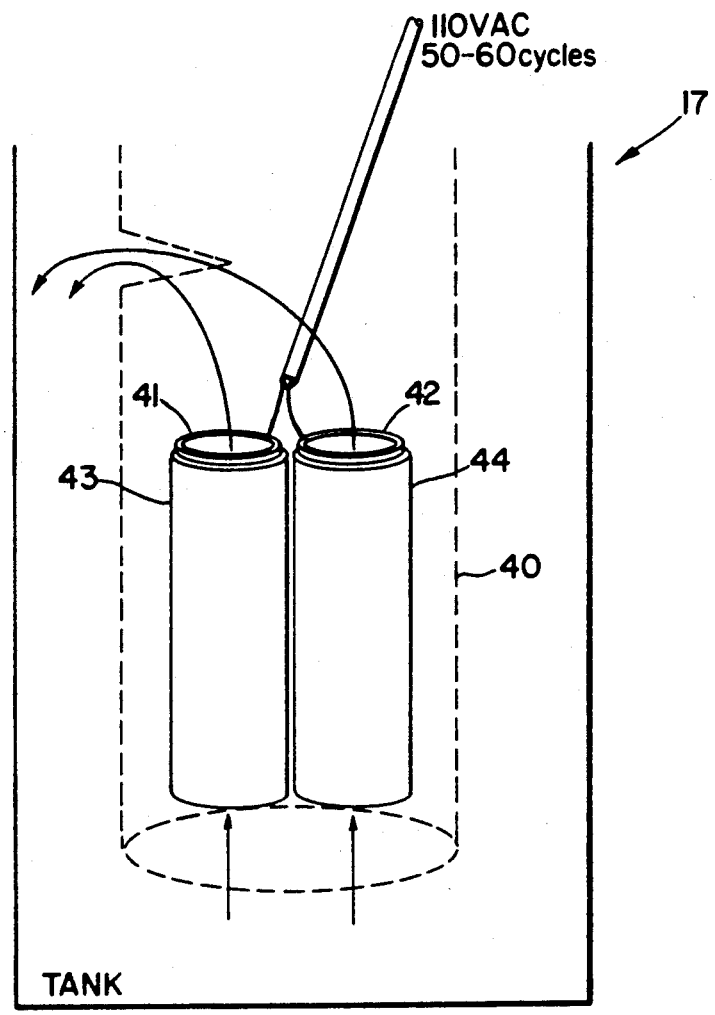
FIG. 2 shows in more detail the electrostatic precipitator.

In FIG. 2, the electrostatic cleansing is performed by an electrostatic precipitator 17 composed of a vertically positioned pipe 40 made of thermal insulating material, preferably polyvinyl chloride, open at the top and bottom, into which is introduced at least two steel or copper tubes 41, 42 onto each one of which is applied an insulating sleeve 43, 44 respectively. The metal tubes are connected to a 110 volt 50–60 cycle AC source. Due to the circulation of the coolant the tubes are self-cleansing. The circulating coolant flows upwardly through the metal tubes as a result of convection, the tubes becoming heated as a result of the current flow and the lowering of the specific gravity of the contaminated coolant. The contaminated coolant flows into the lower open end of the polyvinyl chloride pipe through the vertical metal tubes and the coagulated or precipitated contaminants flow out of the top open end of the polyvinyl chloride pipe to be collected in the bag filter upon recirculation. The electrostatic potential set up in the solution between the stainless steel or copper tubes precipitate the dissolved solids in the contaminated coolant. By keeping the pH of the chemical cleaning solution in an acid pH, precipitation of the contaminant and the dissolution of alkaline salt formations within the cooling system are enhanced. During the treatment of the contaminated coolant the system is monitored to maintain the pH at the optimum level to provide maximum cleaning and descaling of the vehicle cooling system with minimal corrosive attack thereon. Any variances from the optimum level causes introduction of electrolyte into the system. As a result of the design of the eldctrostatic precipitator, gaseous bubble formation is removed from the interior surfaces of the tubes 41, 42 and the tubes can operate in very close proximity to one another.

Figure 3:
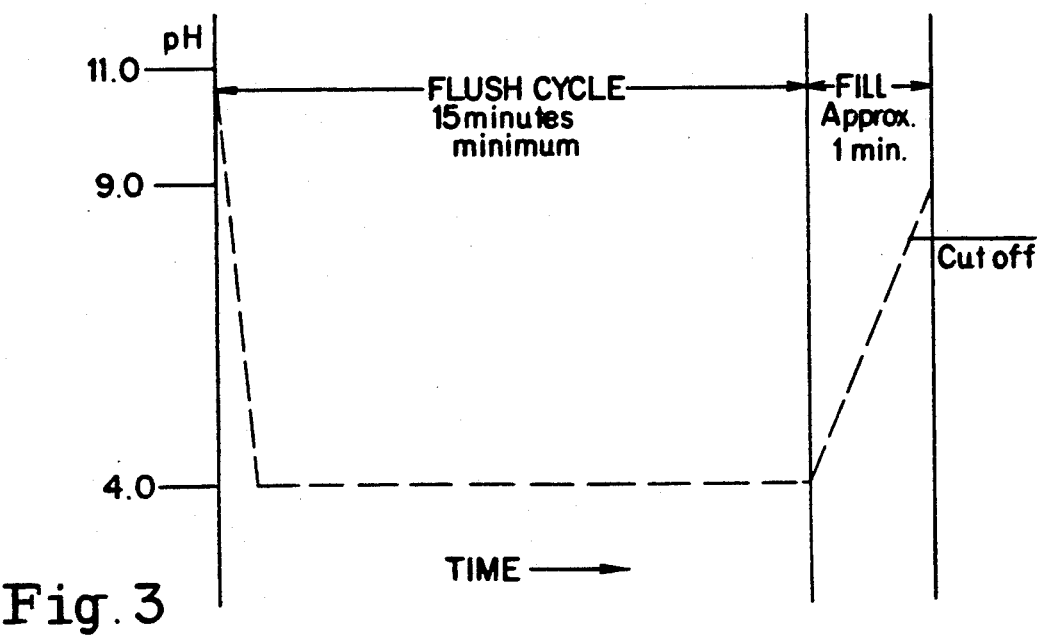
FIG. 3 shows the pH of the coolant through the flush cycle and fill cycle.
Figure 4:
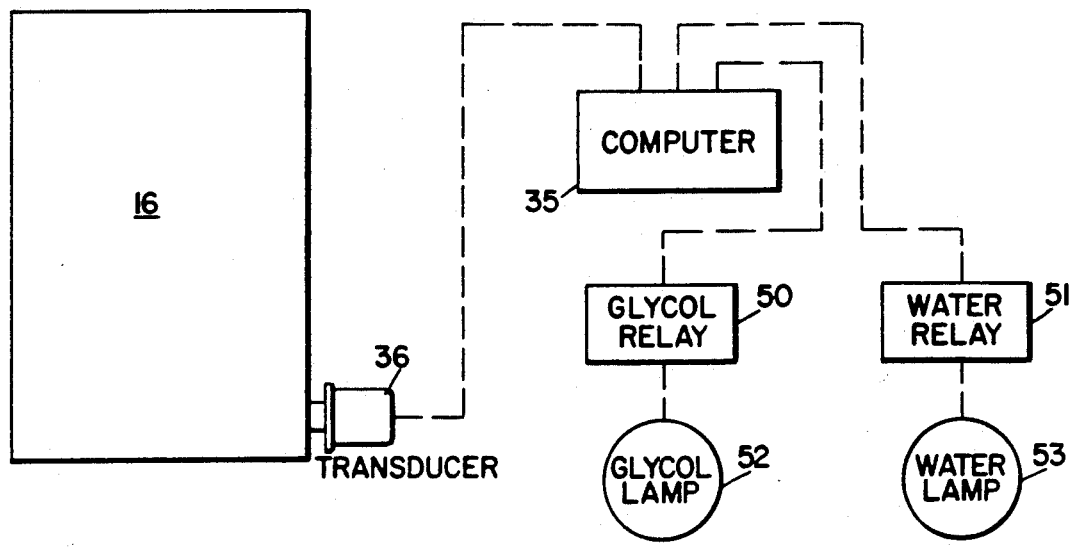
FIG. 4 shows a schematic diagram for controlling the mixture of coolant to water.

The flushing of the contaminated coolant takes place for 15 minutes. During this period pH probe 15 monitors the pH of the coolant and sends signals to the computer 35 which in turn controls the inflow of sulfuric acid cleansing solution into the flush tank 16 from chemical tank 24 through pipe 25 and valve 37. The pH of the coolant upon initially leaving the vehicle is close to a pH of 11 and is immediately reduced to a pH of 4 by introduction of sulfuric acid into flush tank 16 (FIG. 3). During the 15 minute flushing cycle a pressure transducer 36 monitors the pressure in the bottom of the flush tank and sends signals to the computer which in turn converts the signals into a value for the specific gravity of the coolant. Depending upon the value for the specific gravity the computer 35 signals relays 50, 51 which in turn light lights 52, 53 on a display panel whether to add coolant, water or both to the sump 32. The display panel shows a green light 52 if the amount of coolant is insufficient and shows a further green light 53 if the amount of water is insufficient. If both green panel lights 52, 53 are lighted, then both the amount of coolant and the amount of water are insufficient. If the two lights are alternately flashing then coolant/water mix is correct (FIG. 4). At the end of the fifteen minute flushing cycle the vehicle radiator has had removed therefrom build-up and scale within the radiator such as methyl silicate, iron oxide, aluminum hydroxide, lead oxide, cupric oxide, nitrates, phosphates and calcium carbonate, the coolant is at a pH of 4, the proportion of the mixture of coolant to water is 50/50 and the solids, both initially in the contaminated coolant and created by the electrostatic precipitator, have been removed. The vehicle cooling system is now ready to be filled with rejuvenated coolant. The flushing cycle is turned off and the fill cycle begun. During the fill cycle, the valve 19 is closed and the valves 20 and 27 are opened so that the rejuvenated coolant now circulates from the vehicle through pipe 11, filter 13, pipe 14, flush tank 16, pipe 26, fill tank 28, pipe 29, pump 21 and pipe 23 to the vehicle. The fill cycle operates for about 1 minute. During the fill cycle the pH probe 15 monitors the pH and sends signals to the computer which in turn controls the inflow of sodium hydroxide from tank 30 through pipe 31 to fill tank 28. The inflow of sodium hydroxide from tank 30 continues until the pH probe indicates a pH of approximately 8.5 when the inflow is cut off. The pH of the rejuvenated coolant ultimately reaches 9 in the vehicle cooling system. After the coolant reaches a pH of 9 the coolant continues to circulate through the system timed by the computer and the system automatically turns off. The hoses are then disconnected thereby completing the job.

Figure 5:
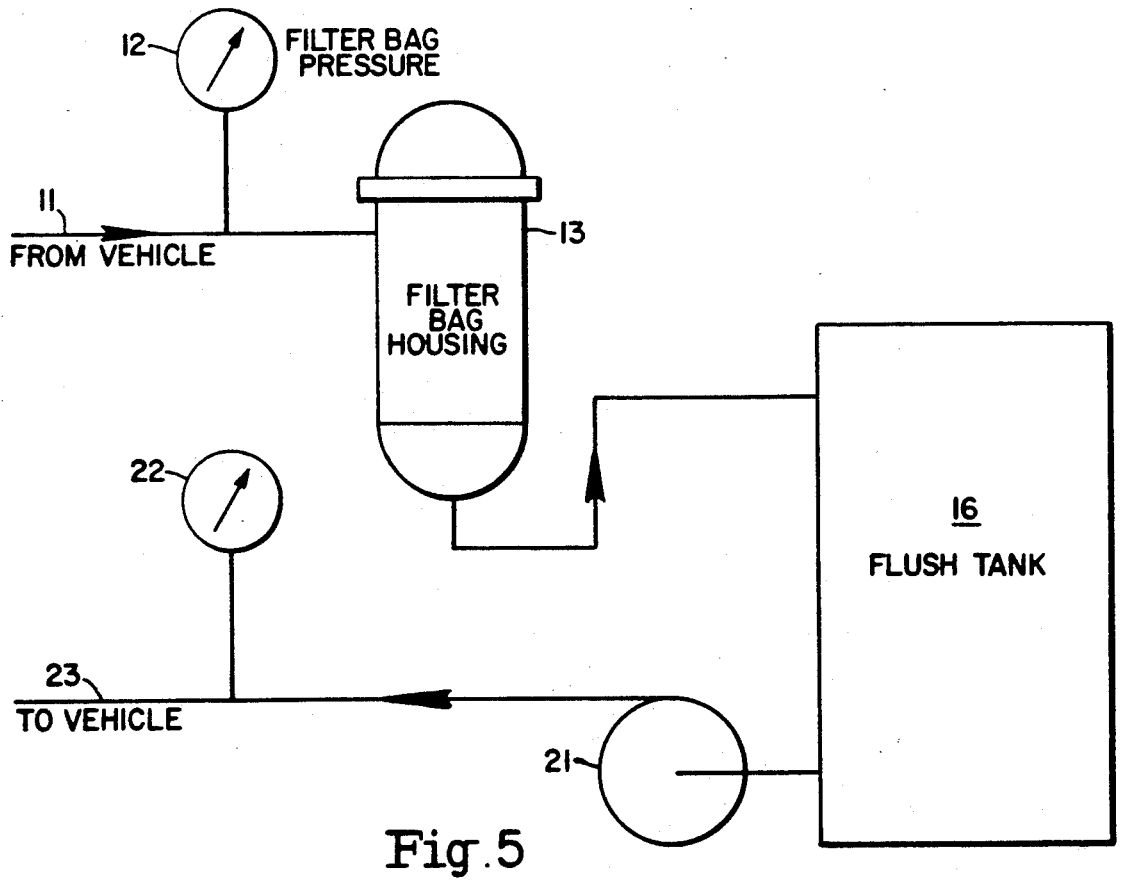
FIG. 5 shows a schematic diagram for testing the vehicle cooling system.

During the flushing cycle the vehicle cooling system is checked for leaks and clogging by monitoring the pressure gauges 12 and 22 (FIG. 5). If the pressure differential between gauges 12 and 22 is above 10 lbs/in$^2$ then this differential could mean that the thermostat in the vehicle may not be open, the cooling system may be clogged, or the bag filter is filled.

Figure 6:
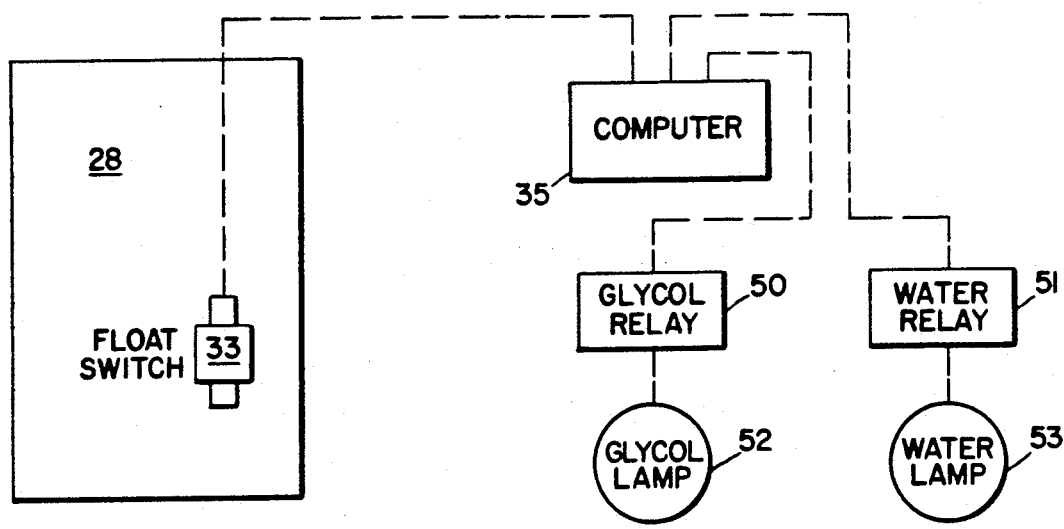
FIG. 6 shows a schematic diagram for controlling the quantity of rejuvenated coolant in the fill tank.
Figure 7:
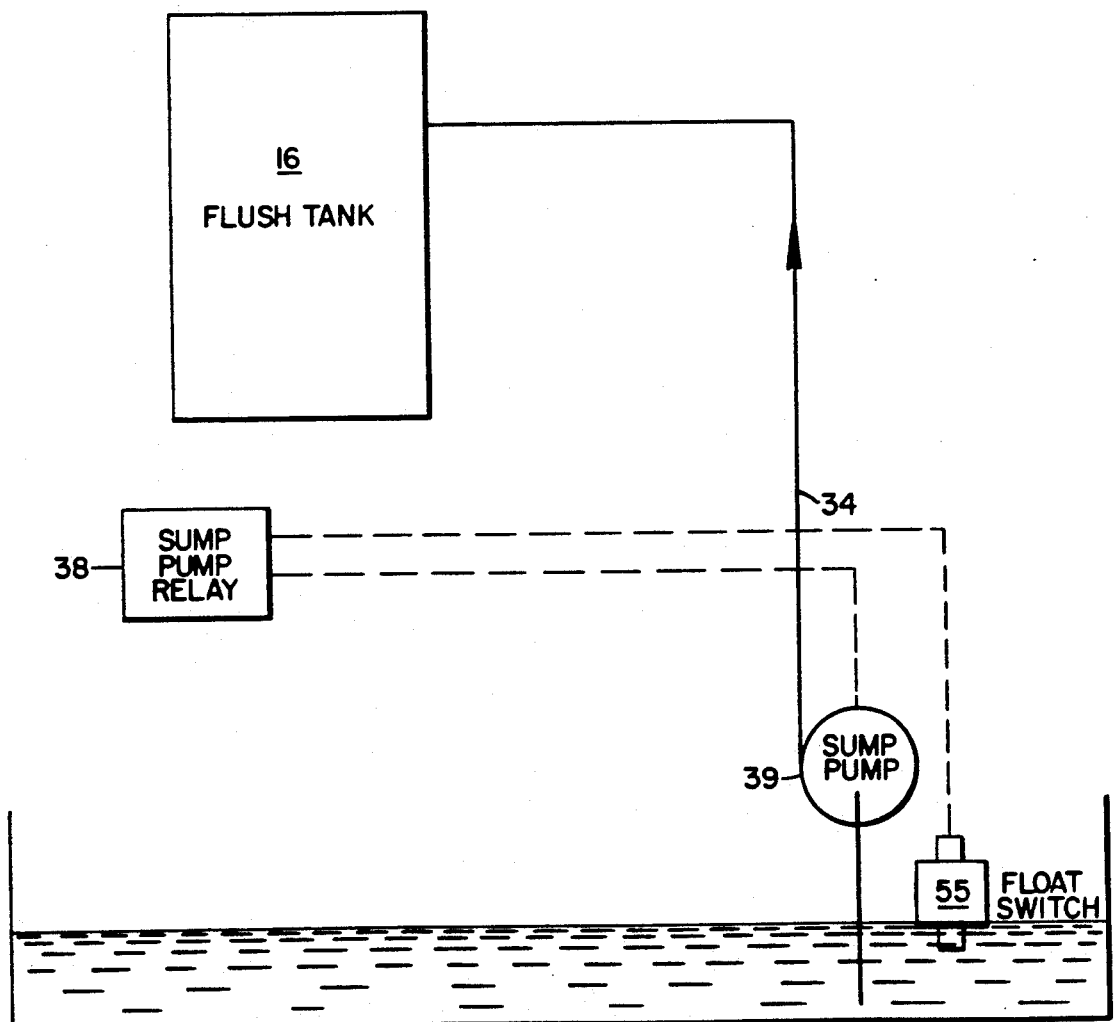
FIG. 7 shows a schematic diagram for adding coolant and water to the flush tank.

To determine that there is sufficient coolant/water mix in the system a float switch 33 is positioned in the fill tank 28 to monitor the amount of coolant/water mix 45. When the mix 45 is too low the float switch 33 sends a signal to the computer 35 which in turn causes the display panel to indicate a need for more coolant and water (FIG. 6). The coolant and water are manually added to the sump 32. With the manual addition of coolant and water to sump 32 a float switch 55 triggers a pump relay 38 which in turn starts the sump pump 39 pumping coolant and water through pipe 34 to flush tank 16 where it passes into the fill tank through pipe 26 (FIG. 7).

The coolant to which reference is made may be ethylene glycol or propylene glycol.

What is claimed is:

1. A cyclic method for removing contaminants from a vehicle cooling system and the coolant circulating therein, comprising pumping a contaminated coolant from the vehicle cooling system, through a filter to form a solids free coolant, passing the solids free coolant to a flush tank refinery, adding an acidic cleansing chemical to the coolant in the flush tank refinery to form an acidic coolant and cleansing chemical mixture, applying a 110 volt 50–60 cycle AC current across said coolant and cleansing chemical mixture to refine said coolant and cleansing chemical mixture by precipitating dissolved solids from said coolant and cleansing chemical mixture, continuously circulating said coolant and cleansing chemical mixture through said flush tank refinery, cooling system, and filter for a period of time sufficient to remove build up and scale from the cooling system and to dissolve alkaline salt formations within the cooling system and to filter out said precipitated solids formed by application of said current to said coolant and cleansing chemical mixture and additional solids as may be further removed from said cooling system during said continuous circulation through said cooling system, thereby forming a refined coolant mixture, adjusting the refined coolant to 50/50 coolant/water mixture by adding additional coolant or water as necessary, and passing the refined coolant/water mixture to a fill tank reservoir, introducing a basic chemical into the refined coolant/water mixture in the fill tank reservoir to raise the pH from an acidic pH level to a basic pH level and passing the refined and pH adjusted coolant back to the vehicle cooling system.

2. The method of claim 1 wherein the acidic pH is 4.

3. The method of claim 1 including the step of stopping the passage of refined coolant directly from the flush tank refinery to the vehicle when passing the refined coolant/water mixture to said fill tank reservoir.

4. The system of claim 1 wherein the basic pH level is 9.

5. The method of claim 1 including measuring the pressure of the coolant at the base of the flush tank refinery and transforming said pressure into specific gravity of said to determine what adjustment is to be made for obtaining a 50/50 coolant/water mixture.

6. The method of claim 5 including monitoring the level of the refined coolant in the fill tank reservoir and signaling the source of coolant makeup to pump coolant into the fill tank reservoir when the level is below a predetermined height.

* * * * *